United States Patent
Hong et al.

(10) Patent No.: US 8,394,493 B2
(45) Date of Patent: *Mar. 12, 2013

(54) BONDING FILM COMPOSITION FOR SEMICONDUCTOR ASSEMBLY, BONDING FILM THEREFROM, AND DICING DIE BOND FILM COMPRISING THE SAME

(75) Inventors: Yong Woo Hong, Suwon-si (KR); Su Mi Im, Uiwang-si (KR); Wan Jung Kim, Suwon-si (KR); Ki Sung Jung, Gunpo-si (KR); Chang Beom Chung, Yongin-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 1597 days.

This patent is subject to a terminal disclaimer.

(21) Appl. No.: 11/826,908

(22) Filed: Jul. 19, 2007

(65) Prior Publication Data
US 2008/0102284 A1    May 1, 2008

(30) Foreign Application Priority Data
Oct. 26, 2006  (KR) .................. 10-2006-0104450

(51) Int. Cl.
*B32B 5/16* (2006.01)
*B32B 7/12* (2006.01)
*C08L 63/00* (2006.01)

(52) U.S. Cl. ........ 428/323; 428/343; 428/354; 428/355; 428/413; 523/400; 523/440

(58) Field of Classification Search .................. 428/343, 428/354, 323, 413
See application file for complete search history.

(56) References Cited

U.S. PATENT DOCUMENTS

| | | | |
|---|---|---|---|
| 5,728,630 A * | 3/1998 | Nishimura et al. | 438/763 |
| 6,617,046 B2 * | 9/2003 | Noro et al. | 428/620 |
| 6,770,370 B2 | 8/2004 | Suzuki et al. | |
| 2001/0023264 A1 * | 9/2001 | Yamamoto | 522/39 |
| 2002/0187353 A1 * | 12/2002 | Nakamura et al. | 428/416 |
| 2003/0159773 A1 * | 8/2003 | Tomiyama et al. | 156/248 |
| 2005/0139973 A1 * | 6/2005 | Matsumura et al. | 257/678 |
| 2005/0267286 A1 * | 12/2005 | Nakamura et al. | 528/408 |
| 2006/0089465 A1 | 4/2006 | Kim et al. | |
| 2006/0154079 A1 * | 7/2006 | Nishikawa | 428/413 |
| 2006/0226525 A1 * | 10/2006 | Osuga et al. | 257/685 |

FOREIGN PATENT DOCUMENTS

| | | |
|---|---|---|
| JP | 2003-286391 | 10/2003 |
| JP | 2004-352871 | 12/2004 |
| KR | 10-2003-0013326 | 2/2003 |
| KR | 10-2006-0035285 | 4/2006 |

OTHER PUBLICATIONS http://www.chemblink.com/products/15525-15-2.htm (no. date available).*
Polymer Handbook, 2005, 4th edition, John Wiley and Sons, Table: glass transition temperatures of polymers.*

* cited by examiner

*Primary Examiner* — Callie Shosho
*Assistant Examiner* — Samir Shah
(74) *Attorney, Agent, or Firm* — Lee & Morse, P.C.

(57) ABSTRACT

A die bonding film composition for semiconductor assembly may include an elastomer resin containing a hydroxyl group, a carboxyl group, or an epoxy group. The die bonding film composition may also include a film forming resin having a glass transition temperature (Tg) in the range of about 0 to 200° C., an epoxy resin, a phenol resin, a hardener, a silane coupling agent, and a filler.

10 Claims, 1 Drawing Sheet 1. a dicing die bond film
2. a bonding film layer
3. an adhesive layer
4. a base film;

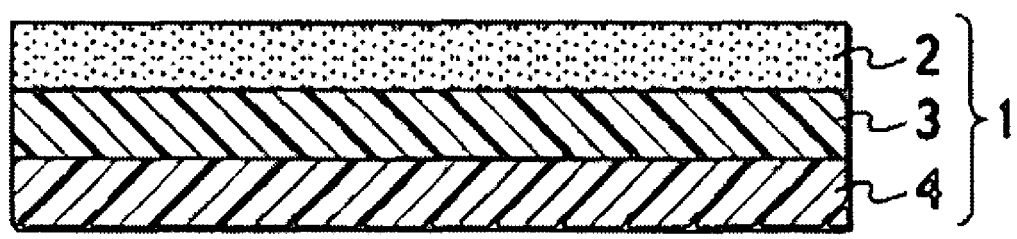
1. a dicing die bond film
2. a bonding film layer
3. an adhesive layer
4. a base film;

BONDING FILM COMPOSITION FOR SEMICONDUCTOR ASSEMBLY, BONDING FILM THEREFROM, AND DICING DIE BOND FILM COMPRISING THE SAME

BACKGROUND OF THE INVENTION

1. Field of the Invention

The present invention relates to a bonding film composition for a semiconductor. More particularly, the present invention relates to a bonding film for semiconductor assembly, in which the bonding film may include both a heat and moisture resistant phenol curable resin and a hardener with high activation temperature.

2. Description of the Related Art

Silver paste has been mainly used for connecting semiconductor devices to their support members or other devices. Recently, bonding film has been more predominantly used instead of silver paste as semiconductor devices become smaller in size and larger in capacity.

Bonding film may be used in semiconductor assembly utilizing a dicing film that is mostly used in a dicing process to fix a semiconductor wafer. The dicing process is a process that may cut the semiconductor wafer into individual chips, followed by an expansion process, a pick-up process and a mounting process.

The dicing film may be formed by coating a UV curable adhesive or a general adhesive on a base film that is typically made of, e.g., vinyl chloride, polyolefin, etc., and then bonding a cover film made of, e.g., PET, thereto. These films may be used in a manner such that a bonding film for semiconductor assembly is affixed to a semiconductor wafer, then overlaid on a dicing film having the cover film removed, followed by cutting according to the dicing process. In recent years, a structure for dicing die bonding film for semiconductor assembly has been produced by laminating a dicing film to an adhesive film. However, unlike traditional dicing films used for dicing only, this film product may have difficulty simultaneously releasing the die and the die adhesive film during the pick-up process. In addition, bubbles may form during the course of bonding the die adhesive film to the rear surface of the semiconductor wafer.

In general, a semiconductor package may go through a reflow process to be mounted on a substrate. If the adhesive film layer loses some of its reflow resistance and thermal cycling resistance qualities, it may either be released or the chips adhesively bonded in the semiconductor package by the adhesive film layer may be cracked.

Also, the content of a hardener in the bonding film composition may be increased to make the adhesive film for semiconductor assembly exhibit high levels of reliability. However, when such an adhesive film having increased hardener content is left at room temperature for an extended period of time, the interlayer bonding force (or adhesive force) resulting from the interaction between an adhesive film layer and an adhesive layer of a dicing film may increase, so that the pick-up success rate in the pick-up process may be lowered. Further, the tensile strength of the film may decrease, and the adhesive film may thus be easily deformed and chopped off during a precutting process where the film is cut to match the shape of the semiconductor wafer, which may cause burr formation or chipping.

SUMMARY OF THE INVENTION

The present invention is therefore directed to a bonding film composition, which substantially overcomes one or more of the problems due to the limitations and disadvantages of the related art.

It is therefore a feature of an embodiment of the present invention to provide a bonding film for semiconductor assembly and a dicing die bond film composed of the bonding film for semiconductor assembly.

At least one of the above and other features and advantages of the present invention may be realized by providing a bonding film composition, which may include, with respect to a total 100% by weight of the bonding film composition, about 5 to 40% by weight of an elastomer resin containing a hydroxyl group, a carboxyl group, or an epoxy group, about 5 to 60% by weight of a film forming resin which may have a glass transition temperature (Tg) in a range of about 0 to 200° C., about 5 to 40% by weight of an epoxy resin, about 0.01 to 10% by weight of a hardener, about 0.01 to 10% by weight of a silane coupling agent, about 3 to 60% by weight of a filler, and about 5 to 40% by weight of a phenol resin that may be represented by the following Formula 1:

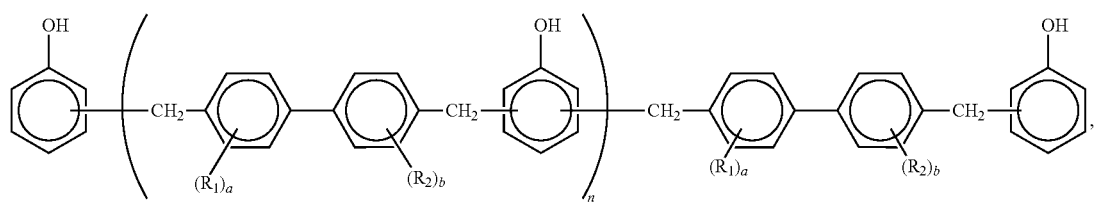

Formula 1 where each of $R_1$ and $R_2$ may be independently $C_{1-4}$ alkyl or hydrogen atom, a and b may be integers in a range from about 0 to 4, respectively, and n may be an integer in a range from about 0 to 7, one or more hardeners represented by Formulas 2 or 3:

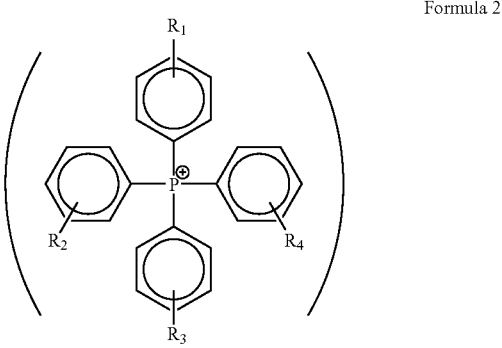

Formula 2

-continued

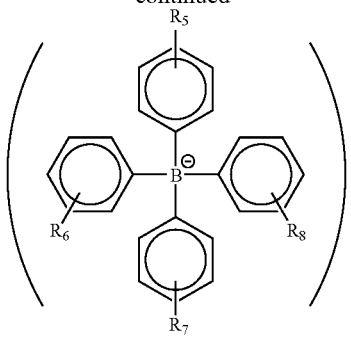

wherein each of $R_1$ to $R_8$ may independently be a hydrogen atom, a halogen atom, or alkyl, Formula 3

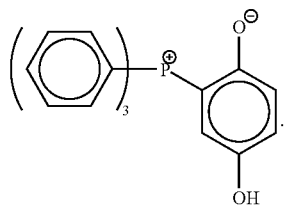

At least one of the above and other features and advantages of the present invention may be realized by providing a bonding film composition, which may include an elastomer resin that may contain a hydroxyl group, a carboxyl group, or an epoxy group, a film forming resin that may have a glass transition temperature (Tg) in a range of 0 to 200° C., an epoxy resin, a phenol resin that may be represented by the Formula 1:

Formula 1

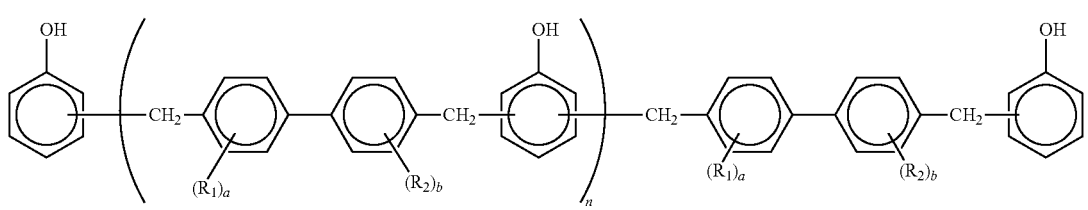

where each of $R_1$ and $R_2$ may be independently $C_{1-4}$ alkyl or hydrogen atom, a and b may be integers in a range from about 0 to 4, respectively, and n may be an integer in a range from about 0 to 7, one or more hardeners that may be represented by Formulas 2 or 3

Formula 2

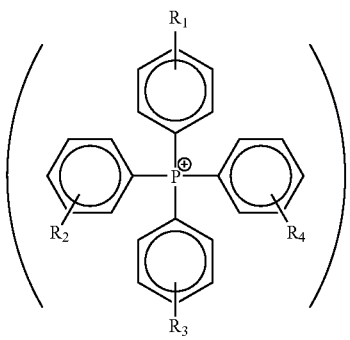

-continued

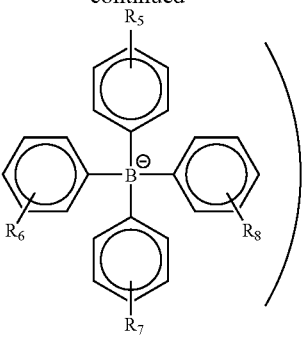

wherein each of $R_1$ to $R_8$ may be independently a hydrogen atom, a halogen atom, or alkyl, Formula 3

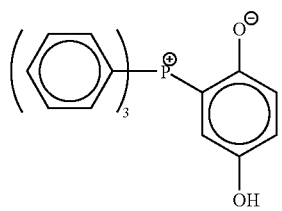

a silane coupling agent, and a filler.

The phenol resin represented by the Formula 1 may have a hydroxyl equivalent weight in a range from about 100 to 600 g/eq. The epoxy resin may be at least one of bisphenol-based epoxy, phenol novolac-based epoxy, ortho-cresol novolac-based epoxy, multifunction epoxy resins, amine-based epoxy, heterocyclic containing epoxy, substituent epoxy, or naphthol-based epoxy. A mixing ratio of the phenol resin to the epoxy resin in terms of a ratio of an epoxy equivalent weight in the epoxy resin to a hydroxyl equivalent weight in the phenol resin may range between about 0.6 and 1.4. The silane coupling agent may be an epoxy containing silane or a mercapto containing silane. The silane coupling agent may be at least one of 2-(3,4 epoxycyclohexyl)-ethyltrimethoxysilane, 3-glycidoxypropyltrimethoxysilane, 3-glycidoxypropyltriethoxysilane, N-2(aminoethyl)-3-aminopropylmethyldimethoxysilane, N-2(aminoethyl)-3-aminopropyltrimethoxysilane, N-2(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, N-methyl-3-aminopropyltrimethoxysilane, 3-mercaptopropylmethyldimethoxysilane, 3-mercaptopropyltriethoxysilane, or 3-isocyanatepropyltriethoxysilane. The filler may be an inorganic filler having a spherical shape or an amorphous shape, and the filler may be in a range from about 5 nm to 10 μm in size.

At least one of the above and other features and advantages of the present invention may be realized by providing a bonding film made from the composition, or a dicing die bond film made from the bonding film.

BRIEF DESCRIPTION OF THE DRAWING

The above and other features and advantages of the present invention will become more apparent to those of ordinary skill in the art by describing in detail exemplary embodiments thereof with reference to the attached drawing, in which:

FIG. 1 illustrates a dicing die bond film according to an embodiment of the present invention.

DETAILED DESCRIPTION OF THE INVENTION

Korean Patent Application No. 10-2006-0104450 filed on Oct. 26, 2006, in the Korean Intellectual Property Office, and entitled: "Bonding Film Composition for Semiconductor Assembly, Bonding Film Therefrom, and Dicing Die Bond Film Comprising the Same," is incorporated by reference herein in its entirety.

The present invention will now be described more fully hereinafter, in which exemplary embodiments of the invention are described. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the disclosure, it will be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

Hereinafter, exemplary embodiments of the present invention will be explained in more detail.

FIG. 1 illustrates a dicing die bond film according to an embodiment of the present invention. Referring to FIG. 1, a dicing die bond film 1 may include a base film 4 on which may be a bonding film layer 2 and an adhesive layer 3.

One embodiment of the present invention relates to a bonding film composition for semiconductor assembly, which may include, with respect to a total 100% by weight of the composition, about 5 to 40% by weight of an elastomer resin containing a hydroxyl group, a carboxyl group, or an epoxy group, about 5 to 60% by weight of a film forming resin that may have a glass transition temperature (Tg) in the range of about 0 to 200° C., about 5 to 40% by weight of an epoxy resin, about 5 to 40% by weight of a phenol resin that may be represented by the following Formula 1, about 0.01 to 10% by weight of a hardener, about 0.01 to 10% by weight of a silane coupling agent, and about 3 to 60% by weight of a filler.

wherein each of $R_1$ and $R_2$ may be independently $C_{1-4}$ alkyl or hydrogen atom, a and b may be integers in the range from about 0 to 4, respectively, and n may be an integer in the range from 0 to 7.

Each ingredient of the composition of the present invention will now be explained in further detail.

Elastomer Resin

The composition of the present invention may include an elastomer resin as a rubber component that may contribute to film formation in order to ensure sufficient strength for ease of handling and proper adhesive force, and the rubber component may contain one of a hydroxyl group, carboxyl group, or epoxy group. The weight average molecular weight of the elastomer resin may be in a range from about 50,000 to 5,000,000, and preferably from about 100,000 to 800,000. However, any suitable molecular weight range may be used. Examples of the elastomer resin may include one or more selected from, e.g., acrylonitriles, butadienes, styrenes, acrylics, methacrylics, isoprenes, ethylenes, butylenes, propylenes, polyurethanes, silicones, etc., but are not limited thereto. Copolymers of these materials may also be used.

Preferably, the elastomer resin content may be in a range from about 5 to 60% by weight, with respect to the total weight of the bonding film composition for semiconductor assembly.

Film Forming Resin

The composition of the invention may include a film forming resin having a high glass transition temperature (Tg) in a range from about 0 to 200° C., which may help the bonding film obtain sufficient strength for ease of handling and proper adhesive force. The film forming resin may be selected from, e.g., a phenol-based resin, a phenoxy-based resin containing a hydroxyl group, epoxy group, phenoxy group or alkyl group, etc., of which the weight average molecular weight may be preferably in a range from about 200 to 500,000.

Examples of a film forming resin having the high glass transition temperature (Tg) may include, but are not limited to, a phenol-based resin or a phenoxy-based resin containing, e.g., hydroquinone, 2-bromohydroquinone, resorcinol, catechol, bisphenol A, bisphenol F, bisphenol AD, bisphenol S, 4,4'-dihydroxy biphenyl, bis(4-hydroxyphenyl)ether, a phenol group, a cresol group, a cresol novolac group, a fluorene backbone, etc. These materials may be phenol-based resins or phenoxy-based resins, where a linear alkyl group, branched alkyl group, substituted allyl group, cyclic aliphatic group, or alkoxy carbonyl group may be introduced into the central carbon atom in, e.g., an alkyl group, aryl group, methylol group, allyl group, cyclic aliphatic group, halogen group, nitro group, bisphenol backbone, etc., and may be used alone or as a mixture thereof.

The film forming resin content is may be in a range of about 5 to 60% by weight, with respect to the total weight of the bonding film composition.

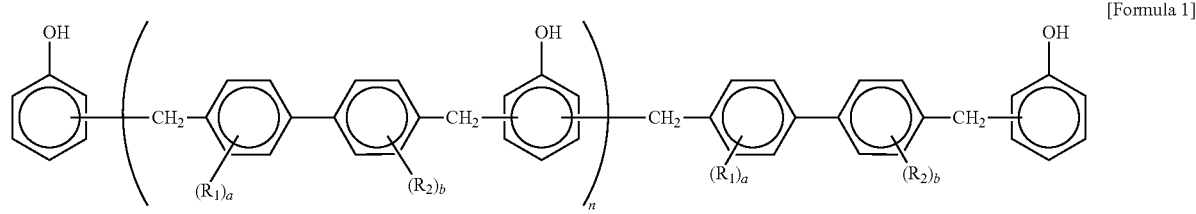

[Formula 1]

Epoxy Resin

The composition of the invention may contain an epoxy resin as a curable adhesive. The epoxy resin may preferably have an epoxy equivalent weight in a range from about 100 to 1500 g/eq, more preferably from about 150 to 800 g/eq, and most preferably from about 150 to 400 g/eq. If the epoxy equivalent weight is below about 100 g/eq, adhesiveness of the hardened material may be liable to degrade. If the epoxy equivalent weight is above 1500 g/eq, the glass transition temperature may be lowered and the heat resistance of the bonding film may become deteriorated. There is no specific limitation to the epoxy resin as long as it may exhibit a satisfactory curing and bonding performance, but a solid epoxy resin or a solid-like epoxy resin having at least one functional group may be preferably used in consideration of the shape of a film.

Examples of the epoxy resin may include, e.g., bisphenols, ortho-cresol novolacs, multifunction epoxy, amine-based epoxy, heterocyclic containing epoxy, substituent epoxy, naphthol-based epoxy, etc. Examples of the epoxy resin may include bisphenol F-type bisphenols, e.g., Epiclon 830-S, Epiclon EXA-830CRP, Epiclon EXA 850-S, Epiclon EXA-850CRP, and Epiclon EXA-835LV (manufactured by Dainippon Ink and Chemicals Inc.), Epicoat 807, Epicoat 815, Epicoat 825, Epicoat 827, Epicoat 828, Epicoat 834, Epicoat 1001, Epicoat 1004, Epicoat 1007, and Epicoat 1009 (manufactured by Japan Epoxy Resins Co., Ltd.), DER-330, DER-301, and DER-361 (manufactured by Dow Chemical Co.) and Yd-128 and YDF-170 (manufactured by Kukdo Chemical Co., Ltd.), etc. The ortho-cresol novolac type resins may include, e.g., YDCN-500-1P, YDCN-500-4P, YDCN-500-5P, YDCN-500-7P, YDCN-500-80P, and YDCN-500-90P (manufactured by Kukdo Chemical Co., Ltd.), EOCN-102S, EOCN-103S, EOCN-104S, EOCN-1012, EOCN-1025, and EOCN-1027 (manufactured by Nippon Kayaku Co., Ltd.), etc. Multifunction epoxy resins may include, e.g., Epon 1031 S (manufactured by Japan Epoxy Resins Co., Ltd.), Araldite 0163 (manufactured by CIBA Specialty Chemicals), Denacol EX-611, Denacol EX-614, Denacol EX-614B, Denacol EX-622, Denacol EX-512, Denacol EX-521, Denacol EX-421, Denacol EX-411, Denacol EX-321 (manufactured by Nagase Chemte X Corporation), etc. Amine-based epoxy resins may include, e.g., Epicoat 604 (manufactured by Japan Epoxy Resins Co., Ltd.), YH-434 (manufactured by Tohto Kasei Co. Ltd.), TETRAD-X and TETRAD-C (manufactured by Mitsubishi Gas Chemical Company Inc.), ELM-120 (manufactured by Sumitomo 3M Ltd.), etc. Heterocyclic containing epoxy resins may include, e.g., PT-810 (manufactured by CIBA Specialty Chemicals), substituent epoxy resins such as ERL-4234, ERL-4299, ERL-4221, and ERL-4206 (manufactured by UCC Company), and naphthol-based epoxy resins such as Epiclon HP-4032, Epiclon HP-4032D, Epiclon HP-4700, and Epiclon 4701 (manufactured by Dainippon Ink and Chemicals, Inc.). The above-described resins may be used alone or in the form of a mixture thereof.

Preferably, the epoxy resin content may be in a range from about 5 to 40% by weight, with respect to the total weight of the bonding film composition for semiconductor assembly.

Phenol Resin

The composition of the invention may include, as hardener, a phenol resin represented by the following Formula 1:

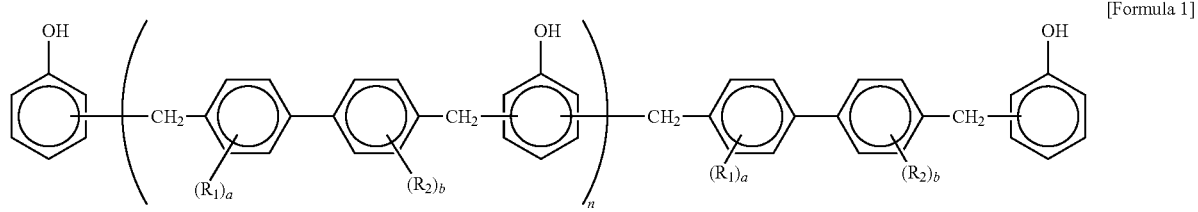

[Formula 1]

where each of $R_1$ and $R_2$ may be independently $C_{1-4}$ alkyl or hydrogen, a and b may be integers in the range from about 0 to 4, respectively, and n may be an integer in the range from about 0 to 7.

The phenol resin represented by Formula 1 may be a compound having more than two hydroxyl groups in one molecule, and may exhibit excellent electrolytic corrosion resistance when moisture is absorbed, excellent heat resistance, and superior reflow resistance because of its low moisture adsorption.

The hydroxyl equivalent weight of the phenol resin represented by Formula 1 may be in a range of from about 100 to 600 g/eq, more preferably from about 170 to 300 g/eq. If the hydroxyl equivalent weight is below about 100 g/eq, the absorption rate may be high and reflow resistance may be apt to degrade. On the contrary, if the hydroxyl equivalent weight is above about 600 g/eq, the glass transition temperature may be lowered and the heat resistance of the bonding film may be likely to deteriorate.

In the present invention, a mixing ratio of the phenol resin represented by Formula 1 to the epoxy resin may range between about 0.6 and 1.4 in terms of the ratio A/B of the epoxy equivalent weight A in the epoxy resin to the hydroxyl equivalent weight B in the phenol resin. Preferably, the ratio A/B may range between about 0.8 and 1.2. If the mixing ratio deviates from the above specified range, the mixing ratio may tend to degrade adhesiveness and hardenability of the bonding film.

The content of the phenol resin hardener represented by Formula 1 may be in a range of from about 5 to 40% by weight, with respect to the total weight of the bonding film composition for semiconductor assembly. If the phenol resin hardener content is below about 5% by weight, its flowability and heat resistance may be liable to degrade. On the contrary, if the phenol resin hardener content is above about 40% by weight, moisture resistance and reflow resistance may be apt to deteriorate.

Hardener

The composition of the invention may include a hardener as a catalyst that shortens hardening or curing time so that the epoxy resin may be completely cured during the semiconductor process. As for the hardener, a compound represented by the following Formula 2 or 3 may be used:

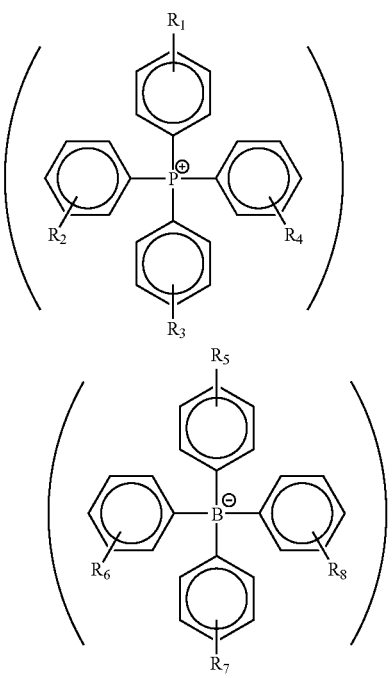

wherein each of $R_1$ to $R_8$ may independently be a hydrogen atom, a halogen atom, or an alkyl,

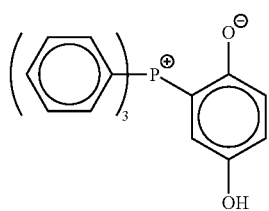

Formula 3 may also be referred to as triphenylphosphine-1,4-benzoquinone.

When using an amine hardener or an imidazole-based hardener for curing the epoxy resin, the curing reaction initiation temperature may be so low that it may become difficult to obtain a uniform cure rate over drying a temperature from about 80° C. to 130° C. during preparation of the bonding film composition, and the storage properties of the bonding film composition at room temperature may become deteriorated. Therefore, it may be advantageous if the hardener has a curing reaction initiation temperature higher than that of the amine hardener or the imidazole-based hardener, so that it may be easy to obtain a uniform cure rate combined with a bonding film composition that may be less reactive at room temperature, which thus may make it easier to secure good storage stability. When a phenol resin represented by Formula 1 is mixed with a commercial amine hardener or imidazole-based hardener, the hardening reaction may partially proceed during a prolonged storage period at room temperature, which may result in non-uniform hardening properties. This, in turn, may lead to void formation or poor adhesiveness during the semiconductor assembly process.

However, if a hardener of Formula 2 or 3 is used in the phenol resin of Formula 1, the hardening reaction at room temperature may be suppressed, which may thereby reduce the defect occurrence during semiconductor assembly due to non-uniform hardening properties.

Moreover, when preparing a bonding film composition for semiconductor assembly by using the hardener of the invention, this bonding film composition may have a relatively low electrical conductivity compared with an amine hardener or an imidazole-based hardener, so that good results may be obtained for PCT (Pressure Cooker Tester) reliability.

The content of the hardener represented by Formula 2 or 3 may be in the range from about 0.01 to 10% by weight, and more preferably from about 0.03 to 5% by weight, with respect to the total weight of the bonding film composition for semiconductor assembly. If the hardener content is below about 0.01% by weight, it may be difficult to establish sufficient cross-linking of the epoxy resin, and the heat resistance may be liable to degrade. Meanwhile, if the hardener content is above about 10% by weight, storage stability of the bonding film may tend to deteriorate.

Silane Coupling Agent

The composition of the present invention may include a silane coupling agent as an adhesive improvement agent to improve adhesive force, i.e., adhesion, between the surface of an inorganic substance such as silica and the resins of an anisotropic conductive film during the mixing process. The silane coupling agent may generally include epoxy containing silane or mercapto-containing silane. The silane coupling agent may include at least one of, but is not limited to, e.g., epoxy-containing silanes such as such as 2-(3,4 epoxycyclohexyl)-ethyltrimethoxysilane, 3-glycidoxypropyltrimethoxysilane, and 3-glycidoxypropyltriethoxysilane; amine containing silanes such as N-2(aminoethyl)-3-aminopropylmethyldimethoxysilane, N-2(aminoethyl)-3-aminopropyltrimethoxysilane, N-2(aminoethyl)3-aminopropyltriethoxysilane, 3-aminopropyltrimethoxysilane, 3-aminopropyltriethoxysilane, 3-triethoxysilyl-N-(1,3-dimethylbutylidene)propylamine, and N-methyl-3-aminopropyltrimethoxysilane; mercapto-containing silanes such as 3-mercaptopropylmethyldimethoxysilane, and 3-mercaptopropyltriethoxysilane; an isocyanate-containing silane such as 3-isocyanatepropyltriethoxysilane, etc. These coupling agents may be used alone or in the form of a mixture thereof.

In the present invention, the silane coupling agent content may be in a range from about 0.01 to 10% by weight, and more preferably from about 0.03 to 5% by weight, with respect to the total weight of the bonding film composition used for semiconductor assembly.

Filler

The composition of the invention may include a filler that exhibits thixotropic properties, which may be used to adjust fusion viscosity. An organic or inorganic filler may be employed according to need. The inorganic filler may include metallic elements, e.g., gold powder, silver powder, copper powder, nickel powder, zinc powder, etc. The inorganic filler may also include non-metallic constituents, e.g., alumina, aluminum hydroxide, magnesium hydroxide, calcium carbonate, magnesium carbonate, calcium silicate, magnesium silicate, calcium oxide, magnesium oxide, aluminum oxide, aluminum nitride, silica, boron nitride, titanium dioxide, glass, iron oxide, ceramics, clays, kaolin, etc. Examples of the organic filler may include, e.g., carbon, carbon black, rubber-based fillers, polymers, etc. There are no specific limitations on the shape and size of the filler, but spherical silica and amorphous silica may be mainly used among the inorganic fillers. The filler may have an average size in the range from about 5 nm to 10 μm, and more preferably from about 10 nm to 3 μm.

The filler content may be in the range from about 3 to 60% by weight, and more preferably from about 5 to 30% by weight, with respect to the total weight of the bonding film composition for semiconductor assembly. If the filler mixing content is below about 3% by weight, the reinforcing effect by the addition of the filler is little. Meanwhile, if the filler content is above about 60% by weight, adhesiveness or bonding property of the adherend may be likely to decrease.

Organic Solvent

The composition of the invention may include an organic solvent to decrease the viscosity of the bonding film composition to a level appropriate to facilitate the manufacture of films for use in semiconductor assembly. Although there is no specific limitation on the organic solvent, a mixture of one or more of, e.g., toluene, xylene, propylene glycol monomethyl ether acetate, ethylene glycol monomethyl ether acetate, benzene, acetone, methyl ethyl ketone, tetrahydrofuran, alkane mixtures, dimethylformaldehyde, cyclohexanone, etc., may be preferably used in consideration of the volatility of the organic solvent during film formation. Due to environmental concerns, the film may also be manufactured using emulsion techniques.

Once a film is formed, the content of a remaining organic solvent may be reduced to below about 1%. This low solvent content may be advantageous because if the content of the remaining organic solvent is too high, volatile ingredients therein may cause problems, i.e., void formation, when a die is affixed to the printed circuit board (PCB) during the assembly process.

Therefore, it may be preferable that the organic solvent content be in a range from about 5 to 70% by weight, excluding the other ingredients, with respect to the total weight of the bonding film composition.

No special machine or equipment is required to form the bonding film for semiconductor assembly with the composition of the present invention. Any preparation method known in the art may be used, without limitation.

For example, an elastomer resin, a film forming resin, epoxy resin, a phenol curing agent represented by Formula 1, a hardener represented by Formula 2 or 3, a silane coupling agent, filler and the like may be dissolved in a solvent, and the mixture may be kneaded by a bead mill for a sufficient length of time. The kneaded mixture may then be coated on a polyethylene terephthalate film and heat-dried, to obtain a bonding film with a proper chip thickness. The bonding film may be about 5 to 200 μm thick, preferably about 10 to 100 μm thick. If the bonding film is thinner than about 5 μm, a sufficient bonding force may not be obtained. On the other hand, if the bonding film is thicker than about 200 μm, economic efficiency may decrease.

Another aspect of the present invention provides a dicing die bonding film including a bonding film for semiconductor assembly.

The dicing die bonding film of the invention may be obtained by layering an adhesive layer and a bonding film layer on a base film in sequence, where the bonding film layer may be incorporated into the dicing die bonding film.

Although any general pressure sensitive adhesive composition (PSA) may be utilized for the adhesive layer, a PSA may be prepared by mixing about 20 to 150 parts UV curable acrylate with respect to 100 parts of a polymer binder with adhesive property, and about 0.1 to 5 parts of a photo-initiator with respect to 100 parts of the UV curable acrylate, the parts being parts by weight.

The base film may be permeable to radioactive rays, and may be made of materials having good light (beam) penetration when a radiation curing adhesive that readily reacts to UV irradiation is added. The polymer employable as the base may include, e.g., a polyolefin monomer or copolymer including polyethylene, polypropylene, a propylene/ethylene copolymer, an ethylene/acrylic acid/ethyl copolymer, an ethylene/acrylic acid/methyl copolymer, an ethylene/vinyl acetate copolymer, polycarbonate, polymethyl methacrylate, poly(vinyl chloride), a polyurethane copolymer, etc. The base film may be preferably about 50 to 200 μm thick in consideration of tensile strength, modulus of elongation, radiation permeability, etc.

Now, exemplary embodiments of the present invention are will be explained in more detail. However, it will be noted that these are for illustrative purposes only and thus are not to limit the scope of the invention.

Data for Examples 1 to 10 may be found in Tables 1 and 2. Data for Comparative Examples 1 to 8 may be found in Tables 3 and 4. The method for obtaining and evaluating Examples 1 to 10 and Comparative Examples 1-8 is set forth below.

The ingredients listed in the following Tables were added to a 1 L cylindrical flask equipped with a high-speed agitator, and were dispersed at 4000 rpm for 20 minutes to produce the target compositions. The compositions were then kneaded by a bead mill for 30 minutes. The compositions were prepared more than twice. With help of an applicator, each of the compositions, which had been subjected to a filtering process using a 50 μm capsule filter, was coated on a polyethylene terephthalate (PET) film followed by surface release treatment to obtain a coating thickness of 20 μm. The compositions were dried at a temperature of 90 to 120° C. for 20 minutes to obtain target bonding films.

TABLE 1

| | | Solid powder[9] Content (%) | Ex. 1 | Ex. 2 | Ex. 3 | Ex. 4 | Ex. 5 |
|---|---|---|---|---|---|---|---|
| Elastomer resin[1] | | 20 | 200 | 205 | 205 | 500 | 55 |
| Film forming resin[2] | | 30 | 90 | 100 | 100 | 143 | 36 |
| Epoxy resin[3] | | 60 | 50 | 80 | 80 | 18 | 130 |
| Phenol Curing agent | Formula 1[4] | 60 | 46 | 76 | 76 | 18 | 130 |
| Hardener | Formula 2[5] | 100 | 2.0 | 3.9 | — | 2 | 2.4 |
| | Formula 3 | 100 | 2.0 | — | 3.9 | 2 | 2.4 |
| Coupling Agent | KBM-403[6] | 100 | 2.4 | 2.4 | 2.4 | 2.4 | 2.4 |
| | KBM-803[7] | 100 | 1.0 | 1.0 | 1.0 | 1.0 | 1.0 |
| Filler | Aerosil-200[8] | 100 | 50 | 50 | 50 | 50 | 25 |
| Total weight | | — | 443.4 | 518.3 | 518.3 | 736.4 | 384.2 |

TABLE 2

| | | Solid powder Content (%) | Ex. 6 | Ex. 7 | Ex. 8 | Ex. 9 | Ex. 10 |
|---|---|---|---|---|---|---|---|
| Elastomer resin | | 20 | 200 | 205 | 205 | 500 | 55 |
| Film forming resin | | 30 | 90 | 100 | 100 | 143 | 36 |
| Epoxy resin | | 60 | 50 | 80 | 80 | 18 | 130 |
| Phenol Curing agent | Formula 1[10] | 60 | 46 | 72 | 72 | 18 | 130 |
| Hardener | Formula 2 | 100 | 2.0 | 3.9 | — | 2.0 | 2.4 |
| | Formula 3 | 100 | 2.0 | — | 3.9 | 2.0 | 2.4 |

TABLE 2-continued

| | | Solid powder Content (%) | Ex. 6 | Ex. 7 | Ex. 8 | Ex. 9 | Ex. 10 |
|---|---|---|---|---|---|---|---|
| Coupling Agent | KBM-403 | 100 | 2.4 | 2.4 | 2.4 | 2.4 | 2.4 |
| | KBM-803 | 100 | 1.0 | 1.0 | 1.0 | 1.0 | 1.0 |
| Filler | Aerosil-200 | 100 | 50 | 50 | 50 | 50 | 25 |
| Total weight | | — | 443.4 | 514.3 | 514.3 | 736.4 | 384.2 |

Remarks—Table 1 and Table 2

1. Elastomer resin: KLS-1045 (hydroxyl value=13 mg KOH/g, acid value=63 mg KOH/g, Tg=38° C., Average molecular weight=690,000, manufactured by Fujikura Kasei. Co., Ltd.).

2. Film forming resin: E4275 (manufactured by JER, Average molecular weight=60,000).

3. Epoxy resin: YDCN-500-5P (manufactured by Kukdo Chemical Co., Ltd., Average molecular weight=10,000 or below).

4. Phenol curing agent of Formula 1 (Table 1): In Formula 1, each of $R_1$ and $R_2$ may be independently a hydrogen atom, a may be 0, b may be 1, and n may be an integer in the range from 0 to 7.

5. Hardener of Formula 2: TPP-K (each of R1 to R8 in Formula 2 may be independently a hydrogen atom, manufactured by HOKKO).

6. Coupling agent: 3-glycidoxypropylmethoxysilane (manufactured by Shin-Etsu Chemical Co., Ltd.).

7. Coupling agent: 3-mercaptopropyltrimethoxysilane (manufactured by Shin-Etsu Chemical Co., Ltd.).

8. Filler: Aerosil-200 (manufactured by Degussa).

9. Cyclohexanone was used as the organic solvent in the preparation.

10. Phenol curing agent of Formula 1 (Examples 6 to 10 in Table 2): In Formula 1, each of $R_1$ and $R_2$ is independently a hydrogen atom, a and b are 1, respectively, and n is an integer in the range from 0 to 7.

TABLE 3

| | | Solid powder[11] Content (%) | Com. Ex. 1 | Com. Ex. 2 | Com. Ex. 3 | Com. Ex. 4 | Com. Ex. 5 |
|---|---|---|---|---|---|---|---|
| Elastomer resin[1] | | 20 | 200 | 200 | 200 | 200 | 200 |
| Film forming resin[2] | | 30 | 90 | 90 | 90 | 90 | 90 |
| Epoxy resin[3] | | 60 | 50 | 50 | 50 | 50 | 50 |
| Phenol Curing agent | Formula 1[4] | 60 | — | — | — | 45 | 45 |
| | Novolac system[5] | 60 | 28 | 28 | 28 | — | — |
| Hardener | Formula 2[6] | 100 | — | 2.0 | — | — | — |
| | Formula 3 | 100 | — | — | 2.0 | — | — |
| | Imidazole[7] | 100 | 2.0 | — | — | — | 3.9 |
| Coupling Agent | KBM-403[8] | 100 | 2.4 | 2.4 | 2.4 | 2.4 | 2.4 |
| | KBM-803[9] | 100 | 1.0 | 1.0 | 1.0 | 1.0 | 1.0 |
| Filler | Aerosil-200[8] | 100 | 50 | 50 | 50 | 50 | 50 |
| Total weight | | — | 423.4 | 423.4 | 423.4 | 438.4 | 442.3 |

TABLE 4

| | | Solid powder Content (%) | Com. Ex. 6 | Com. Ex. 7 | Com. Ex. 8 |
|---|---|---|---|---|---|
| Elastomer resin | | 20 | 200 | 200 | 200 |
| Film forming resin | | 30 | 90 | 90 | 90 |
| Epoxy resin | | 60 | 50 | 50 | 50 |
| Phenol Curing agent | Formula 1[12] | 60 | — | 50 | 50 |
| | Novolac system[5] | 60 | 28 | — | — |
| Hardener | Formula 2 | 100 | — | — | — |
| | Formula 3 | 100 | — | — | — |
| | Imidazole | 100 | — | — | 3.9 |
| Coupling Agent | KBM-403 | 100 | 2.4 | 2.4 | 2.4 |
| | KBM-803 | 100 | 1.0 | 1.0 | 1.0 |
| Filler | Aerosil-200 | 100 | 50 | 50 | 50 |
| Total weight | | — | 421.4 | 443.4 | 447.3 |

Remarks—Table 3 and Table 4

1. Elastomer resin: KLS-1045 (hydroxyl value=13 mgKOH/g, acid value=63 mgKOH/g, Tg=38° C., Average molecular weight=690,000, manufactured by Fujikura Kasei. Co., Ltd.).

2. Film forming resin: E4275 (manufactured by Japan Epoxy Resin Co. Ltd, Average molecular weight=60,000).

3. Epoxy resin: YDCN-500-5P (manufactured by Kukdo Chemical Co. Ltd., Average molecular weight=10,000 or below).

4. Phenol curing agent of Formula 1 (Table 3): In Formula 1, each of $R_1$ and $R_2$ is independently a hydrogen atom, a is 0, b is 1, and n is an integer in the range from 0 to 7.

5. Phenol curing agent (Novolac system): HF-1M (manufactured by Meiwa Kasei Co. Ltd), Average molecular weight=5,000 or below).

6. Hardener of Formula 2: TPP-K (each of $R_1$ to $R_8$ in Formula 2 is independently a hydrogen atom, manufactured by HOKKO Chemical Co. LTD.).

7. Hardener (imidazole-based hardener): 2-methyl imidazole (2MZ, manufactured by Shikoku Chemical Co.).

8. Coupling agent: 3-glycidoxypropylmethoxysilane (manufactured by Shin-Etsu Chemical Co., Ltd.).

9. Coupling agent: 3-mercaptopropyltrimethoxysilane (manufactured by Shin-Etsu Chemical Co., Ltd.).

10. Filler: Aerosil-200 (manufactured by Degussa).

11. Cyclohexanone was used as the organic solvent in the preparation.

12. Phenol curing agent of Formula 1 (Comparative Examples 6 to 8 in Table 4): In Formula 1, each of $R_1$ and $R_2$ is independently a hydrogen atom, a and b are 1, respectively, and n is an integer in the range from 0 to 7.

Evaluation on physical properties of bonding films produced in Examples and Comparative Examples The physical properties of the bonding films for semiconductor assembly obtained from Examples 1 to 10 and Comparative Examples 1 to 8 were evaluated as follows, and the results are presented in Table 5 through Table 8. Each bonding film was subjected to a reflow resistance test and the temperature cycling resistance test, and exfoliated portions and cracks were observed using SAT (Scanning Acoustic Tomography). In addition, die shear strength of each bonding film was measured.

(1) Tensile strength: The bonding films were left at room temperature (25° C.) for 1 hour. Then, using a dog bone shaped specimen of 20 mm×50 mm in size and 20 μm in thickness, the tensile strength of each bonding film was measured and the results are shown in Table 5 to Table 8.

(2) Reflow resistance test: The bonding films were mounted on a 100 μm thick wafer coated with an oxide film, and cut into chips with a size of 8 mm×8 mm and a size of 10 mm×10 mm. Then, the chips were affixed to a multichip (MCP) package in two layers, molded with epoxy molding compound (EMC) (Product name: SG-8500BC, manufactured by Cheil Industries Inc) at 175° C. for 60 seconds, and then subjected to post curing at 175° C. for 2 hours. Test pieces thus prepared were moisture absorbed for 168 hours under the conditions of 85° C./60 RH %, and a reflowing process was conducted three times in a row at the highest temperature of 260° C. The delaminated portions and cracks on each test piece were observed through SAT, and the results are shown in Table 5 to Table 8. A test piece with an occurrence of exfoliated portions and cracks was regarded as "poor."

(3) Temperature cycling resistance test: After the reflow resistance test, a temperature cycling (−55° C., 15 minutes, air)↔(125° C., 15 minutes, air) on each test piece was repeated over 2000 times. Again, the delaminated portion and cracks on each test piece were observed through SAT, and the results are shown in Table 5 to Table 8. If a test piece had more than 10% of delaminated portions or any occurrence of cracks was regarded as "poor."

(4) Moisture resistance test: When the reflow test was completed, each of the test pieces was put in a PCT and treated for 240 hours. Then, the delaminated portion and cracks on each test piece were observed through SAT, and the results are shown in Table 5 to Table 8. If a test piece had more than 10% of delaminated portions or any occurrence of cracks was regarded as "poor." At this time, it was observed whether each test piece was discolored.

(5) Die shear strength: A 530 μm thick wafer coated with an oxide film was cut into 5 mm×5 mm in size, and each chip was laminated with a bonding film at the temperature of 60° C. The well-bonded portions were kept and the other (partially debonded) portions were cut away. An upper chip of 5 mm×5 mm in size was placed on a lower chip of 10 mm×10 mm in size, and the chips were put on a hot plate at 120° C. Thereafter, a force of 1 kgf was applied to the chips for 10 seconds to bond them together, which were then allowed to harden at 175° C. for 2 hours. The test pieces thus prepared were moisture absorbed at 85° C./60 RH % for 168 hours, and a reflowing process of the highest temperature of 260° C. was conducted three times consecutively. Thereafter, die shear strength of the upper chip was measured at 250° C. and 100 μm/sec. The test results are shown in Table 5 to Table 8.

(6) Storage stability test: The bonding films were left under the conditions of 23° C. and 50 RH % for 30 days to prepare test pieces. Then, test pieces for the die shear strength test were prepared and the die shear strength test was conducted under the same conditions as before, for a comparison with original die shear strengths. The strength reduction results are shown in Table 5 to Table 8.

(7) Electrical conductivity: After the bonding films were hardened at 175° C. for 2 hours, and 2 g of each was put in a PP bottle (Nalgene). 80 g of ultra pure water was poured into the bottle and then discharged at 100° C. over a span of 24 hours. Next, the electrical conductivity of the discharged water was measured with a conductivity meter.

TABLE 5

| Comparison items | Ex. 1 | Ex. 2 | Ex. 3 | Ex. 4 | Ex. 5 |
|---|---|---|---|---|---|
| Tensile strength (kgf/mm²) | 1.9 | 2.0 | 2.0 | 1.9 | 2.3 |
| Reflow resistance test | Good | Good | Good | Good | Good |

TABLE 5-continued

| Comparison items | Ex. 1 | Ex. 2 | Ex. 3 | Ex. 4 | Ex. 5 |
|---|---|---|---|---|---|
| Delaminated portions | 0% | 0% | 0% | 0% | 0% |
| Cracks | 0/90 | 0/90 | 0/90 | 0/90 | 0/90 |
| Temperature cycling resistance test | Good | Good | Good | Good | Good |
| Delaminated portions | 0/45 | 0/45 | 0/45 | 0/45 | 0/45 |
| Cracks | 0/45 | 0/45 | 0/45 | 0/45 | 0/45 |
| Cycle (Count) | 2000 | 2000 | 2000 | 2000 | 2000 |
| Moisture resistance test | Good | Good | Good | Good | Good |
| Delaminated portions | 0/45 | 0/45 | 0/45 | 0/45 | 0/45 |
| Cracks | 0/45 | 0/45 | 0/45 | 0/45 | 0/45 |
| Discoloration | None | None | None | None | None |
| Injection time (hr) | 240 | 240 | 240 | 240 | 240 |
| Die shear strength (original) (Unit: kgf) | 16.7 | 18.5 | 18.3 | 16.8 | 17.2 |
| Die shear strength (after 30 days)(unit: kgf) | 15.5 | 17.7 | 17.4 | 15.1 | 16.5 |
| Strength reduction (%) | 8% | 5% | 5% | 5% | 4% |
| Electrical conductivity (unit: μs/cm) | 9.4 | 10.2 | 10.3 | 11.5 | 8.8 |

TABLE 6

| Comparison items | Ex. 6 | Ex. 7 | Ex. 8 | Ex. 9 | Ex. 10 |
|---|---|---|---|---|---|
| Tensile strength (kgf/mm²) | 2.3 | 2.6 | 2.6 | 2.2 | 2.1 |
| Reflow resistance test | Good | Good | Good | Good | Good |
| Delaminated portions | 0% | 0% | 0% | 0% | 0% |
| Cracks | 0/90 | 0/90 | 0/90 | 0/90 | 0/90 |
| Temperature cycling resistance test | Good | Good | Good | Good | Good |
| Delaminated portions | 0/45 | 0/45 | 0/45 | 0/45 | 0/45 |
| Cracks | 0/45 | 0/45 | 0/45 | 0/45 | 0/45 |
| Cycle (Count) | 2000 | 2000 | 2000 | 2000 | 2000 |
| Moisture resistance test | Good | Good | Good | Good | Good |
| Delaminated portions | 0/45 | 0/45 | 0/45 | 0/45 | 0/45 |
| Cracks | 0/45 | 0/45 | 0/45 | 0/45 | 0/45 |
| Discoloration | None | None | None | None | None |
| Injection time (hr) | 240 | 240 | 240 | 240 | 240 |
| Die shear strength (original) (Unit: kgf) | 19.7 | 18.5 | 18.9 | 17.8 | 18.2 |
| Die shear strength (after 30 days)(unit: kgf) | 18.3 | 17.6 | 17.7 | 16.9 | 16.9 |
| Strength reduction (%) | 7% | 5% | 6% | 5% | 7% |
| Electrical conductivity (unit: μs/cm) | 11.3 | 10.5 | 10.8 | 11.0 | 9.8 |

TABLE 7

| Comparison items | Com. Ex. 1 | Com. Ex. 2 | Com. Ex. 3 | Com. Ex. 4 | Com. Ex. 5 |
|---|---|---|---|---|---|
| Tensile strength (kgf/mm²) | 1.5 | 1.6 | 1.4 | 1.3 | 1.5 |
| Reflow resistance test | Good | Good | Good | Good | Good |
| Delaminated portions | 6/90 | 0/90 | 0/90 | 35/90 | 10/90 |
| Cracks | 0/90 | 0/90 | 0/90 | 18/90 | 0/90 |
| Temperature cycling resistance test | Poor | Poor | Poor | Dropped | Poor |
| Delaminated portions | 15/42 | 7/45 | 6/45 | | 13/40 |
| Cracks | 10/42 | 3/45 | 4/45 | | 8/40 |
| Cycle (Count) | 600 | 600 | 300 | | 1000 |
| Moisture resistance test | Poor | poor | Poor | Dropped | Poor |
| Delaminated portions | 14/42 | 11/45 | 7/45 | | 3/40 |
| Cracks | 0/42 | 0/45 | 0/45 | | 0/40 |
| Discoloration | Yes | None | None | | Yes |
| Injection time (hr) | 96 | 96 | 96 | | 96 |
| Die shear strength (original) (Unit: kgf) | 11.5 | 9.7 | 8.5 | 3.5 | 12.3 |

TABLE 7-continued

| Comparison items | Com. Ex. 1 | Com. Ex. 2 | Com. Ex. 3 | Com. Ex. 4 | Com. Ex. 5 |
|---|---|---|---|---|---|
| Die shear strength (after 30 days)(unit: kgf) | 5.2 | 9.1 | 8.1 | 2.2 | 3.8 |
| Strength reduction (%) | 55% | 6% | 5% | 37% | 69% |
| Electrical conductivity (unit: μs/cm) | 51.5 | 19.8 | 23.3 | 21.5 | 48.1 |

TABLE 8

| Comparison items | Com. Ex. 6 | Com. Ex. 7 | Com. Ex. 8 |
|---|---|---|---|
| Tensile strength (kgf/mm$^2$) | 1.6 | 1.2 | 1.5 |
| Reflow resistance test | Good | Poor | Good |
| Delaminated portions | 36/90 | 40/90 | 8/90 |
| Cracks | 20/90 | 16/90 | 0/90 |
| Temperature cycling resistance test | Dropped | Poor | Poor |
| Delaminated portions | | 25/25 | 11/41 |
| Cracks | | 15/25 | 7/41 |
| Cycle (Count) | | 300 | 1000 |
| Moisture resistance test | Dropped | Poor | Poor |
| Delaminated portions | | 17/25 | 4/41 |
| Cracks | | 4/25 | 0/41 |
| Discoloration | | None | Yes |
| Injection time (hr) | | 48 | 96 |
| Die shear strength (original) (Unit: kgf) | 3.9 | 4.7 | 12.3 |
| Die shear strength (after 30 days)(unit: kgf) | 2.4 | 3.3 | 3.8 |
| Strength reduction (%) | 38% | 30% | 69% |
| Electrical conductivity (unit: μs/cm) | 21.8 | 20.3 | 49.6 |

As may be seen from Table 5 to Table 8, the bonding films (Examples 1 to 10), to which the phenol curing agent represented by Formula 1 and the hardener represented by Formula 2 or 3 were added, exhibited higher tensile strength values, excellent reflow resistance, excellent temperature cycling resistance, and excellent moisture resistances, compared with the bonding films (Comparative Examples 1 to 8) to which a novolac phenol curing agent was added, instead of the phenol curing agent represented by Formula 1, and an imidazole-based hardener was added in replacement of the hardener represented by Formula 2 or 3. Alternately, no curing agent was added. It was observed that the bonding films that were catalytically hardened by the hardener of Formula 2 or 3 suffered smaller reductions in die shear strength even when they were left at room temperature for an extended period of time, which may thereby result in high levels of reliability. In contrast, the bonding films (Comparative Examples 1 to 8) that were catalytically hardened by the imidazole-based hardener suffered great reductions in the die shear strength, which may result in severe deterioration in reliability. Further, the bonding films catalytically hardened by the hardener of Formula 2 or 3 had much lower electrical conductivities than those in the bonding films catalytically hardened by the imidazole-based hardener, thereby resulting in high levels of reliability in PCT.

As has been observed, the bonding film for semiconductor assembly according to the present invention may include a phenol curable resin having excellent heat resistance and moisture resistance to thereby provide a high reliability, and further may include a hardener having a high activation temperature to thereby provide the long-term storage stability.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A bonding film composition, comprising, with respect to a total 100% by weight of the bonding film composition:
   about 5 to 40% by weight of an elastomer resin containing a hydroxyl group, a carboxyl group, or an epoxy group;
   about 5 to 60% by weight of a film forming resin having a glass transition temperature (Tg) in a range of about 0 to 200° C.;
   about 5 to 40% by weight of an epoxy resin;
   about 0.01 to 10% by weight of a hardener, wherein the hardener includes at least one compound represented by the following Formulas 2 or 3:

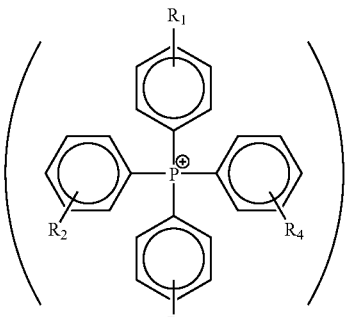

Formula 2

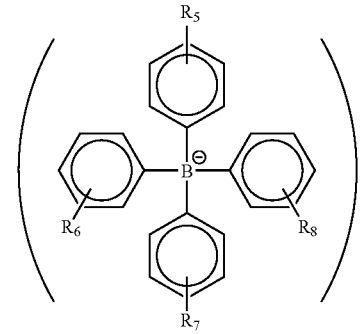

wherein each of $R_1$ to $R_8$ is independently a hydrogen atom, a halogen atom, or alkyl,

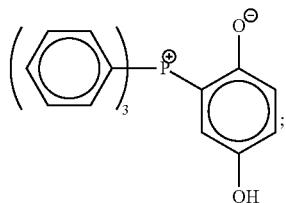

Formula 3 about 0.01 to 10% by weight of a silane coupling agent;
about 3 to 60% by weight of a filler; and about 5 to 40% by weight of a phenol resin represented by the following Formula 1:

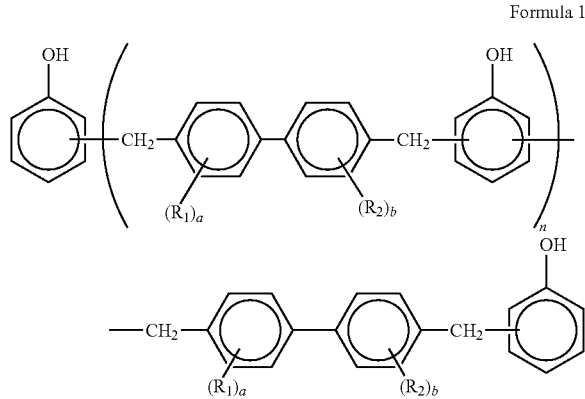

Formula 1 where each of $R_1$ and $R_2$ is independently $C_{1-4}$ alkyl or hydrogen atom, a and b are integers in a range from about 0 to 4, respectively, and n is an integer in a range from about 0 to 7.

2. The bonding film composition as claimed in claim 1, wherein the phenol resin represented by the Formula 1 has a hydroxyl equivalent weight in a range from about 100 to 600 g/eq.

3. The bonding film composition as claimed in claim 1, wherein the epoxy resin is at least one of bisphenol-based epoxy, phenol novolac-based epoxy, ortho-cresol novolac-based epoxy, multifunction epoxy resins, amine-based epoxy, heterocyclic containing epoxy, substituent epoxy, or naphthol-based epoxy.

4. The bonding film composition as claimed in claim 1, wherein a mixing ratio of the phenol resin to the epoxy resin in terms of a ratio of an epoxy equivalent weight in the epoxy resin to a hydroxyl equivalent weight in the phenol resin ranges between about 0.6 and 1.4.

5. The bonding film composition as claimed in claim 1, wherein the silane coupling agent is an epoxy containing silane or a mercapto containing silane.

6. The bonding film composition as claimed in claim 1, wherein the silane coupling agent is at least one of 2-(3,4 epoxycyclohexyl)-ethyltrimethoxysilane, 3-glycidoxypropyltrimethoxysilane, 3-glycidoxypropyltriethoxysilane, N-2 (aminoethyl)-3-aminopropylmethyldimethoxysilane, N-2 (aminoethyl)3-aminopropyltrimethoxysilane, N-2 (aminoethyl)3-aminopropyltriethoxysilane, 3-aminopropyltrimethoxysilane, 3-aminopropyltriethoxysilane, 3-triethoxysilyl-N-(1,3-dimethylbutylidene)propylamine, N-methyl-3-aminopropyltrimethoxysilane, 3-mercaptopropylmethyldimethoxysilane, 3-mercaptopropyltriethoxysilane, or 3-isocyanatepropyltriethoxysilane.

7. The bonding film composition as claimed in claim 1, wherein the filler is an inorganic filler having a spherical shape or an amorphous shape, and the filler is in a range from about 5 nm to 10 μm in size.

8. A bonding film for semiconductor assembly, comprising the bonding film composition as claimed in claim 1.

9. A dicing die bond film, comprising the bonding film for semiconductor assembly as claimed in claim 8.

10. A dicing die bond film, comprising:
a base film;
an adhesive layer on the base film; and
a bonding film layer on the adhesive layer,
wherein the adhesive layer includes a pressure sensitive adhesive composition (PSA) that contains about 20 to 150 parts UV curable acrylate with respect to 100 parts of a polymer binder, and about 0.1 to 5 parts of photoinitiator with respect to 100 parts of the UV curable acrylate, and the bonding film layer is a bonding film for semiconductor assembly made from the bonding film composition as claimed in claim 1.

* * * * *